US011255400B2

(12) United States Patent
Mori et al.

(10) Patent No.: US 11,255,400 B2
(45) Date of Patent: Feb. 22, 2022

(54) DAMPING FORCE ADJUSTABLE SHOCK ABSORBER

(71) Applicant: HITACHI AUTOMOTIVE SYSTEMS, LTD., Ibaraki (JP)

(72) Inventors: Shunsuke Mori, Yokohama (JP); Hiroshi Murakami, Ebina (JP)

(73) Assignee: HITACHI ASTEMO, LTD., Ibaraki (JP)

(*) Notice: Subject to any disclaimer, the term of this patent is extended or adjusted under 35 U.S.C. 154(b) by 369 days.

(21) Appl. No.: 16/311,264

(22) PCT Filed: Jun. 21, 2017

(86) PCT No.: PCT/JP2017/022813
§ 371 (c)(1),
(2) Date: Dec. 19, 2018

(87) PCT Pub. No.: WO2017/221967
PCT Pub. Date: Dec. 28, 2017

(65) Prior Publication Data

US 2019/0323575 A1 Oct. 24, 2019

(30) Foreign Application Priority Data

Jun. 24, 2016 (JP) ............................. JP2016-125559

(51) Int. Cl.
*F16F 9/34* (2006.01)
*F16F 9/46* (2006.01)
(Continued)

(52) U.S. Cl.
CPC .................. *F16F 9/46* (2013.01); *F16F 9/34* (2013.01); *F16F 9/48* (2013.01); *H01F 2007/086* (2013.01)

(58) Field of Classification Search
CPC ......... F16F 9/46; F16F 9/461; F16K 31/0693; H01F 2007/086
(Continued)

(56) References Cited

U.S. PATENT DOCUMENTS 4,390,158 A * 6/1983 Lang .................. F16K 31/0693 251/129.15
5,346,175 A * 9/1994 Hunnicutt ................ B62D 6/02 137/529

(Continued)

FOREIGN PATENT DOCUMENTS

JP 59-160969 10/1984
JP 02-248784 10/1990

(Continued)

OTHER PUBLICATIONS

International Search Report dated Sep. 19, 2017 in International (PCT) Application No. PCT/JP2017/022813.

(Continued)

*Primary Examiner* — Bradley T King
(74) *Attorney, Agent, or Firm* — Wenderoth, Lind & Ponack, L.L.P

(57) ABSTRACT

A damping force adjustable shock absorber includes an electromagnetic damping force adjustment device (17) having a damping force adjustment valve (18), and a solenoid (33) configured to variably adjust the damping force. The solenoid includes a coil (39) configured to generate a magnetic force by power supply, a movable iron core (43) located on an inner peripheral side of the coil, an anchor member (40) configured to attract the movable iron core. The movable iron core includes a thick cylindrical portion (43A) and a taper cylindrical portion (43B). The thick cylindrical portion includes a fixation hole (43A1) in which a shaft portion (44) is fixed. The taper cylindrical portion has an inner peripheral surface flaring so as to define a taper
(Continued)

shape. A recessed portion (43A2) is formed around the fixation hole. The recessed portion allows hydraulic fluid to flow in an axial direction of the movable iron core.

12 Claims, 6 Drawing Sheets

(51) Int. Cl.
*F16F 9/48* (2006.01)
*H01F 7/08* (2006.01)

(58) Field of Classification Search
USPC .................................................... 251/129.15
See application file for complete search history.

(56) References Cited

U.S. PATENT DOCUMENTS

2010/0187459 A1* 7/2010 Kratzer .................. B60T 8/363 251/129.15
2011/0073424 A1* 3/2011 Murakami ............. F16F 9/465 188/322.13
2015/0276084 A1* 10/2015 Heingl ............... G05D 16/2022 251/129.15
2015/0291142 A1* 10/2015 Lee ...................... B60T 15/027 251/129.02
2018/0094692 A1* 4/2018 Hase ...................... F16F 9/461
2020/0063886 A1* 2/2020 Schneider .............. F16K 11/07

FOREIGN PATENT DOCUMENTS

JP 06-035758 5/1994
JP 2011-038630 2/2011
JP 2013-213588 10/2013
JP 2014-11352 1/2014

OTHER PUBLICATIONS

Office Action dated Dec. 16, 2020 in German Patent Application No. 11 2017 003 159.1, with English translation.

* cited by examiner

DAMPING FORCE ADJUSTABLE SHOCK ABSORBER

TECHNICAL FIELD

The present invention relates to a damping force adjustable shock absorber mounted on a vehicle such as a four-wheeled automobile and preferably used to absorb a vibration of the vehicle.

BACKGROUND ART

A damping force adjustable shock absorber is provided between a relatively movable wheel side and vehicle body side on a vehicle such as a four-wheeled automobile, and is configured to absorb, for example, a vertical vibration generated while the vehicle is running. As this damping force adjustable shock absorber, there is known a shock absorber configured to include an electromagnetic damping force adjustment device configured to variably adjust a damping force according to a running condition, a behavior of a vehicle, and/or the like (for example, refer to PTL 1).

CITATION LIST

Patent Literature

PTL 1: Japanese Patent Application Public Disclosure No. 2013-213588

SUMMARY OF INVENTION

Technical Problem

Then, there is such a demand that the electromagnetic damping force adjustment device discussed in PTL 1 is desired to achieve an excellent dynamic characteristic when a movable iron core is displaced.

An object of the present invention is to provide a damping force adjustable shock absorber capable of achieving the excellent dynamic characteristic when the movable iron core is displaced.

Solution to Problem

According to one aspect of the present invention, a damping force adjustable shock absorber includes a cylinder sealingly containing hydraulic fluid therein, a piston inserted in the cylinder and dividing an inside of the cylinder into a rod-side chamber and a bottom-side chamber, a piston rod having one side coupled with the piston and the other side extending out of the cylinder, a flow passage configured to cause the hydraulic fluid to flow therethrough due to extension and compression of the piston rod, and a damping force adjustment valve provided in the flow passage and configured to be driven by a solenoid. The solenoid includes a coil configured to generate a magnetic force by power supply, a movable iron core located on an inner peripheral side of the coil and provided axially movably, a fixed iron core located so as to axially face the movable iron core and provided on the inner peripheral side of the coil, a bottomed cylindrical overmold covering an outer periphery of the coil, and a shaft portion provided so as to axially extend on inner peripheral sides of the movable iron core and the fixed iron core and configured to be displaced integrally with the movable iron core. A valve body of the damping force adjustment valve is provided on one end portion of the shaft portion on the fixed iron core side. A communication passage is provided on the shaft portion. The communication passage extends while axially penetrating. The communication passage establishes communication between the valve body side and the other end portion side of the shaft portion positioned on an opposite side of the movable iron core from the fixed iron core. The movable iron core includes a thick cylindrical portion and a taper cylindrical portion. The thick cylindrical portion axially faces the fixed iron core and has a fixation hole on an inner peripheral side thereof. The shaft portion is fixed in the fixation hole. The taper cylindrical portion axially extends from this thick cylindrical portion toward the other end portion side of the shaft portion, and has an inner peripheral surface flaring so as to define a taper shape.

According to the one aspect of the present invention, it is possible to achieve the excellent dynamic characteristic when the movable iron core is displaced.

DESCRIPTION OF EMBODIMENTS

Figure 1:
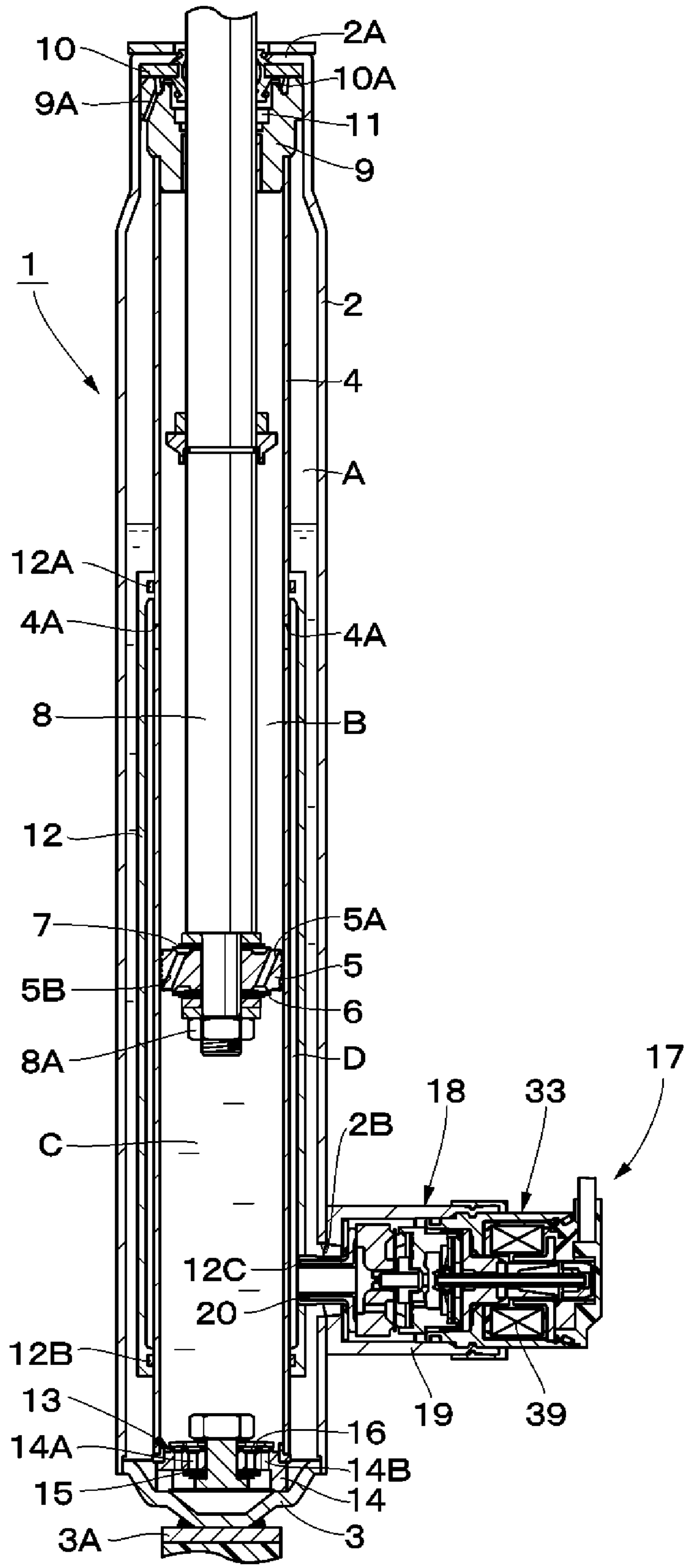
FIG. 1 is a vertical cross-sectional view illustrating a damping force adjustable shock absorber according to an embodiment of the present invention.

In the following description, a damping force adjustable shock absorber according to an embodiment of the present invention will be described in detail with reference to FIGS. 1 to 5 based on an example in which this damping force adjustable shock absorber is applied to a damping force adjustable shock absorber for use in a vehicle.

A damping force adjustable hydraulic shock absorber 1 (hereinafter referred to as a shock absorber 1) includes an outer shell formed by a bottomed cylindrical outer cylinder 2. A lower end side of this outer cylinder 2 is closed by a bottom cap 3 with use of the welding method or the like, and an upper end side of the outer cylinder 2 includes a swaged portion 2A bent radially inward. A rod guide 9 and a seal member 10 are provided between the swaged portion 2A and an inner cylinder 4. On the other hand, an opening 2B is formed on a lower portion side of the outer cylinder 2 concentrically with a connection port 12C of an intermediate cylinder 12, which will be described below, and an electromagnetic damping force adjustment device 17, which will be described below, is attached so as to face this opening 2B.

Further, a mounting eye 3A, which is attached to, for example, a wheel side of the vehicle, is provided on the bottom cap 3.

The inner cylinder 4 is provided in the outer cylinder 2 concentrically with this outer cylinder 2. This inner cylinder 4 forms a cylinder together with the outer cylinder 2. The inner cylinder 4 has a lower end side fittedly attached to a bottom valve 13 and an upper end side fittedly attached to the rod guide 9. Hydraulic fluid (oil fluid) as working fluid is sealingly contained in the outer cylinder 2 and the inner cylinder 4. The fluid used as the hydraulic fluid is not limited to the oil, and may be, for example, water containing an additive mixed therein.

An annular reservoir chamber A is defined between the inner cylinder 4 and the outer cylinder 2, and gas is sealingly contained in this reservoir chamber A together with the above-described oil fluid. This gas may be air in an atmospheric pressure state, or gas such as compressed nitrogen gas may be used as it. Further, an oil hole 4A is pierced radially at a position on the inner cylinder 4 on the way in a length direction (an axial direction) thereof. The oil hole 4A establishes constant communication of a rod-side chamber B with an annular chamber D.

A piston 5 is slidably inserted in the inner cylinder 4. This piston 5 divides the inside the inner cylinder 4 into the rod-side chamber B and a bottom-side chamber C. A plurality of oil passages 5A and a plurality of oil passages 5B are each formed on the piston 5 at intervals in a circumferential direction. The oil passages 5A and 5B can establish communication between the rod-side chamber B and the bottom-side chamber C.

Then, a disk valve 6 on an extension side is provided on a lower end surface of the piston 5. This disk valve 6 on the extension side is opened upon exceedance of a pressure in the rod-side chamber B over a relief setting value when the piston 5 is slidably displaced upward during an extension stroke of the piston rod 8, and relieves a pressure at this time by releasing it to the bottom-side chamber C side via each of the oil passages 5A. This relief setting value is set to a higher pressure than a valve-opening pressure when the electromagnetic damping force adjustment device 17, which will be described below, is set to a hard side.

A compression-side check valve 7 is provided on an upper end surface of the piston 5. The compression-side check valve 7 is opened when the piston 5 is slidably displaced downward during a compression stroke of the piston rod 8, and otherwise is closed. This check valve 7 functions to permit a flow of the oil fluid in the bottom-side chamber C through each of the oil passages 5B toward the rod-side chamber B, and prohibit a flow of the oil fluid in an opposite direction therefrom. A valve-opening pressure of this check valve 7 is set to a lower pressure than the valve-opening pressure when the electromagnetic damping force adjustment device 17, which will be described below, is set to a soft side, and the check valve 7 generates substantially no damping force. Generating substantially no damping force here means a force equal to or weaker than friction of the piston 5 and the seal member 10, and not effecting a motion of the vehicle.

A piston rod 8 axially extending in the inner cylinder 4 is provided in such a manner that a lower end side thereof as one side is inserted in the inner cylinder 4 and coupled with the piston 5 with use of a nut 8A and the like. Further, an upper end side as the other side of the piston-rod 8 protrudes and extends out ofthe outer cylinder 2 and the inner cylinder 4 via the rod guide 9. The piston 8 may be configured as a so-called double rod by further extending the lower end of the piston 8 to, cause it to protrude outward from a bottom portion (for example, the bottom cap 3) side.

The stepped cylindrical rod guide 9 is provided on the upper end side of the inner cylinder 4. The rod guide 9 positions an upper portion of the inner cylinder 4 at a center of the outer cylinder 2, and also axially slidably guides the piston rod 8 on an inner peripheral side thereof. Further, the annular seal member 10 is provided between the rod guide 9 and the swaged portion 2A of the outer cylinder 2. The seal member 10 is a member formed by baking an elastic member such as rubber to a metallic disk plate including a hole formed at a center thereof for insertion of the piston rod 8, and functions to seal between the seal member 10 and the piston rod 8 by a sliding contact of an inner periphery thereof to an outer peripheral side of the piston rod 8.

Further, a lip seal 10A is formed on the seal member 10 on a lower surface side. The lip seal 10A serves as a check valve extending so as to contact the rod guide 9. The lip seal 10A is disposed between an oil pool chamber 11 and the reservoir chamber A, and functions to permit a flow of the oil fluid and the like in the oil pool chamber 11 toward the reservoir chamber A side via a return passage 9A of the rod guide 9 and prohibit a flow in an opposite direction therefrom.

The intermediate cylinder 12 is arranged at a position between the outer cylinder 2 and the inner cylinder 4. The intermediate cylinder 12 is, for example, attached to an outer peripheral side of the inner cylinder 4 via upper and lower cylindrical seals 12A and 12B. The intermediate cylinder 12 forms therein the annular chamber D extending so as to surround an outer peripheral side of the inner cylinder 4 along an entire circumference thereof, and the annular chamber D is prepared as an oil chamber independent of the reservoir chamber A. The annular chamber D is in constant communication with the rod-side chamber B via the radial oil hole 4A formed through the inner cylinder 4. In other words, the annular chamber D forms a flow passage through which a flow of the oil fluid is generated due to the extension and compression of the piston rod 8. Further, the connection port 12C is provided on a lower end side of the intermediate cylinder 12. A cylindrical holder 20 of a damping force adjustment valve 18, which will be described below, is attached to the connection port 12C.

The bottom valve 13 is positioned on the lower end side of the inner cylinder 4 and is provided between the bottom cap 3 and the inner cylinder 4. The bottom valve 13 includes a valve body 14, a compression-side disk valve 15, and an extensions-die check valve 16. The valve body 14 defines the reservoir chamber A and the bottom-side chamber C between the bottom cap 3 and the inner cylinder 4. The disk valve 15 is provided on a lower surface side of the valve body 14. The check valve 16 is provided on an upper surface side of the valve body 14. Oil passages 14A and 14B are each formed on the valve body 14 at intervals in the circumferential direction. The oil passages 14A and 14B can establish communication between the reservoir chamber A and the bottom-side chamber C.

The compression-side disk valve 15 is opened upon exceedance of a pressure in the bottom-side chamber C over a relief setting value when the piston 5 is slidably displaced downward during a compression stroke of the piston rod 8, and relieves a pressure at this time by releasing it to the reservoir chamber A side via each of the oil passages 14A. This relief setting value is set to a higher pressure than the valve-opening pressure when the electromagnetic damping force adjustment device 17, which will be described below, is set to the hard side.

The extension-side check valve 16 is opened when the piston 5 is slidably displaced upward during the extension stroke of the piston rod 8, and otherwise is closed. This check valve 16 functions to permit a flow of the oil fluid in the reservoir chamber A through each of the oil passages 14B toward the bottom-side chamber C, and prohibit a flow of the oil fluid in an opposite direction therefrom. A valve-opening pressure of this check valve 16 is set to a lower pressure than the valve-opening pressure when the electromagnetic damping force adjustment device 17, which will be described below, is set to a soft side, and the check valve 7 generates substantially no damping force.

Figure 2:
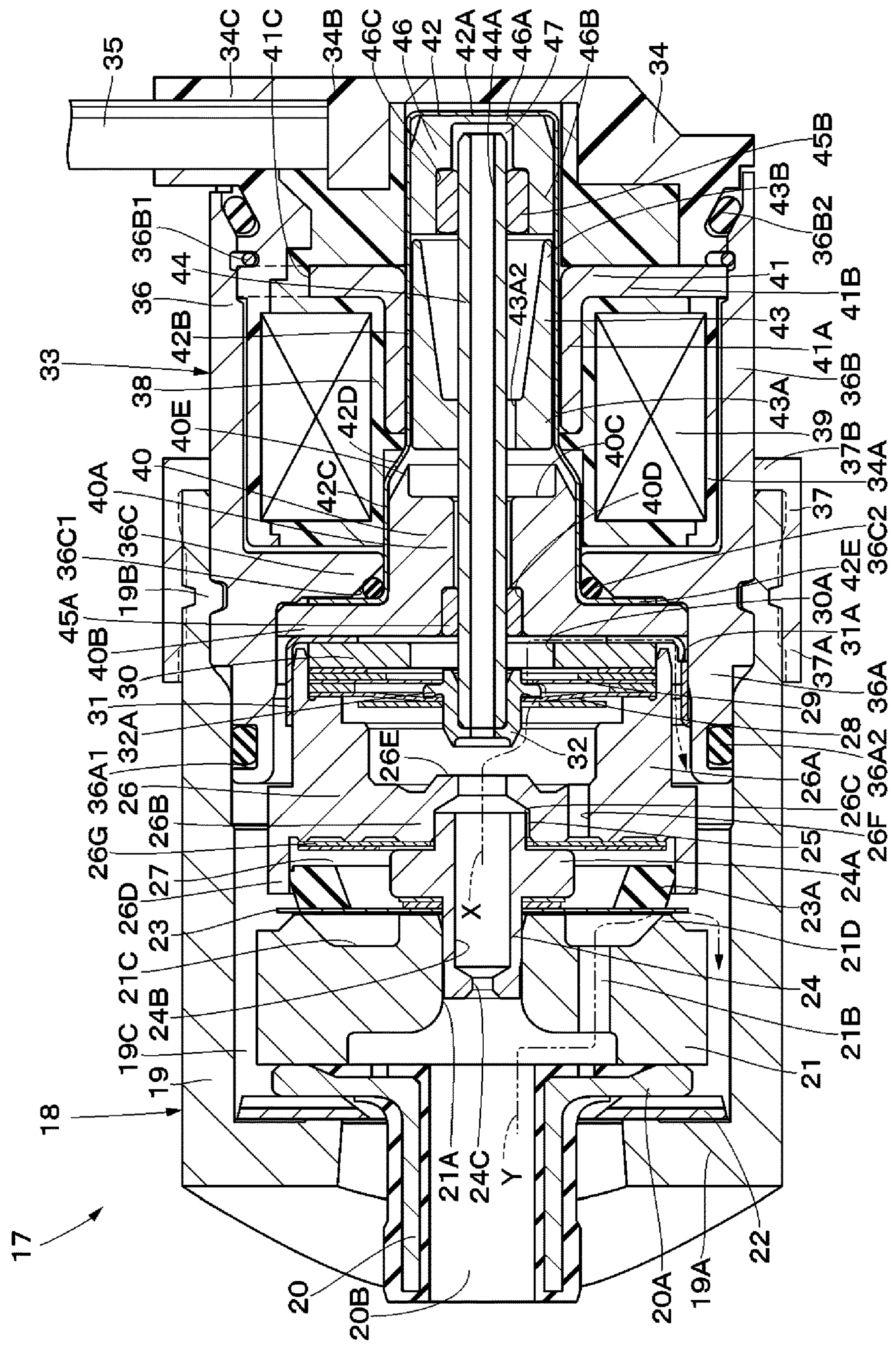
FIG. 2 is an enlarged cross-sectional view illustrating an electromagnetic damping force adjustment device in FIG. 1 in an enlarged manner.
Figure 3:
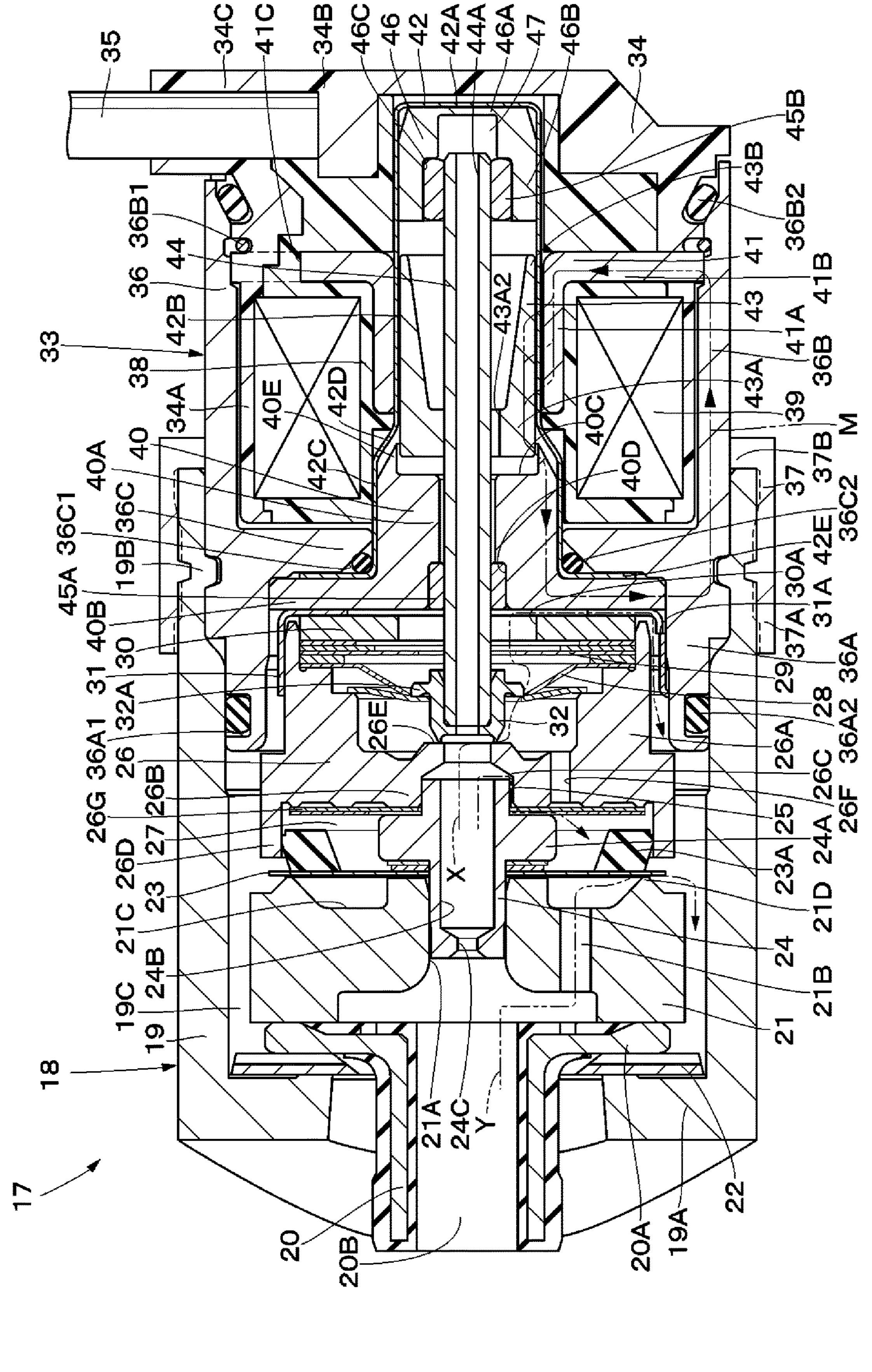
FIG. 3 is an enlarged cross-sectional view illustrating the electromagnetic damping force adjustment device when power is supplied to a coil.

Next, the electromagnetic damping force adjustment device 17 for variably adjusting a damping force to be generated by the shock absorber 1 will be described with reference to FIGS. 1 to 5. FIG. 2 illustrates a valve-opened state in which a valve body 32 is moved (displaced) toward a valve-opening side where the valve body 32 is separated away from a valve seat portion 26E of a pilot valve 26 due to a hydraulic pressure when no power is supplied to a coil 39 of a solenoid 33. Further, FIG. 3 illustrates a valve-closed state in which the valve body 32 is moved toward a valve-closing side where the valve body 32 is seated on the valve seat portion 26E of the pilot valve 26 based on power supply to the coil 39 of the solenoid 33.

As illustrated in FIG. 1, the electromagnetic damping force adjustment device 17 is provided at a position on a lower end side of the annular chamber D as a flow passage. In other words, a proximal end side (one end side and a left end side in FIGS. 1 to 3) of the electromagnetic damping force adjustment device 17 is disposed so as to be located between the reservoir chamber A and the annular chamber D, and a distal end side (the other end side and a right end side in FIGS. 1 to 3) of the electromagnetic damping force adjustment device 17 is provided so as to protrude from the lower portion side of the outer cylinder 2 radially outward. This electromagnetic damping force adjustment device 17 includes the damping force adjustment valve 18 and the solenoid 33. The damping force adjustment valve 18 generates the damping force. The solenoid 33 drives the damping force adjustment valve 18 while variably adjusting the damping force to be generated.

More specifically, the electromagnetic damping force adjustment device 17 generates the damping force by controlling the flow of the oil fluid from the annular chamber D to the reservoir chamber A with use of the damping force adjustment valve 18. Further, the electromagnetic damping force adjustment device 17 variably adjusts the damping force to be generated by adjusting a valve-opening pressure of the damping force adjustment valve 18 (for example, a main disk valve 23) by the solenoid 33 used as a damping force variable actuator.

Now, the damping force adjustment valve 18 includes the generally cylindrical valve case 19, the cylindrical holder 20, a valve member 21, the main disk valve 23, the valve body 32, and the like. The valve case 19 is provided in such a manner that a proximal end side thereof is fixedly attached around the opening 2B of the outer cylinder 2 and a distal end side thereof protrudes from the outer cylinder 2 radially outward. The cylindrical holder 20 is provided in such a manner that a proximal end side thereof is fixed to the connection port 12C of the intermediate cylinder 12, and a distal end side thereof forms an annular flange portion 20A and is arranged inside the valve case 19 with a space generated therebetween. The valve member 21 is in abutment with the flange portion 20A of this cylindrical holder 20.

The proximal end side of the valve case 19 forms an inner flange portion 19A protruding radially inward, and the distal end side of the valve case 19 forms a fixation portion that engages and fixedly swages an inner peripheral-side engagement portion 19B of this valve case 19 with a cylindrical case 36 of the solenoid 33, which will be described below. A space between an inner peripheral surface of the valve case 19 and outer peripheral surfaces of the valve member 21, the valve body 26, and the like, which will be described below, forms as annular oil chamber 19C leading to the reservoir chamber A.

An inner side of the cylindrical holder 20 forms an oil passage 20B having one end side in communication with the annular chamber D and the other end side extending to a position of the valve member 21. Further, an annular spacer 22 is sandwiched between the flange portion 20A of the cylindrical holder 20 and the inner flange portion 19A of the valve case 19. This spacer 22 is a member that establishes communication between the oil chamber 19C and the reservoir chamber A.

An axially extending central hole 21A is provided on the valve member 21 at a position of a radial center thereof. Further, a plurality of oil passage 21B is provided on the valve member 21 at intervals in the circumferential direction around the central hole 21A, and each of these oil passages 21B has one end side in constant communication with the oil passage 20B side of the cylindrical holder 20. Further, an annular recessed portion 21C and an annular valve seat 21D are provided on an end surface of the valve member 21 on the other end side thereof. The annular recessed portion 21C is formed so as to surround openings of the oil passages 21B on the other side. The annular valve seat 21D is positioned on a radially outer side of this annular recessed portion 21C. The main disk valve 23, which will be described below, is seated on and separated from the annular valve seat 21D. Now, the oil passages 21B of the valve member 21 function to allow the oil fluid to flow between the annular chamber D side (the oil passage 20B side) and the reservoir chamber A side (the oil chamber 19C side) via the main disk valve 23.

The main disk valve 23, which forms a main valve, is provided in such a manner that an inner peripheral side thereof is sandwiched between the valve member 21 and a large-diameter portion 24A of a pilot pin 24, which will be described below, and an outer peripheral side thereof is seated on the annular valve seat 21D of the valve member 21. An elastic seal member 23A is fixedly attached to the outer peripheral portion of the main disk valve 23 on a back surface side thereof. The main disk valve 23 is opened by receiving a pressure on the oil passage 21B side (the annular chamber D side) of the valve member 21 to be separated from the annular valve seat 21D, and establishes communication of the oil passage 21B of the valve member 21 (the annular chamber D side) with the oil chamber 19C (the reservoir chamber A side). In this case, a valve-opening pressure of the main disk valve 23 is variably controlled according to a pressure in a pilot chamber 27, which will be described below.

The pilot pin 24 is formed into a stepped cylindrical shape including the large-diameter portion 24A at an axially intermediate portion thereof and also including an axially extending central hole 24B at a radially central portion thereof, and an orifice 24C is formed at one end portion of the central hole 24B. The pilot pin 24 is press-fitted at one end side thereof in the central hole 21A of the valve member 21, and sandwiches the main disk valve 23 between the large-diameter portion 24A and the valve member 21. The other end side of the pilot pin 24 is fitted in a central hole 26C of the pilot pin 26, which will be described below. In this state, an axially extending oil passage 25 is formed between the central hole 26C of the pilot body 26 and the other end side of the pilot pin 24, and this oil passage 25 establishes a connection to a pilot chamber 27 formed between the main disk valve 23 and the pilot body 26 therethrough.

The pilot body 26 is formed into a generally bottomed cylindrical shape including a cylindrical portion 26A and a bottom portion 26B. The cylindrical portion 26A includes a stepped hole formed inside it. The bottom portion 26B closes this cylindrical portion 26A. The central hole 26C is provided at a central portion of the bottom portion 26B. The other end side of the pilot pin 24 is fitted in the central hole 26C. A protrusion cylindrical portion 26D is provided on one end side (the left end side in FIG. 2) of the bottom portion 26B of the pilot body 26. The protrusion cylindrical portion 26D is positioned on an outer diameter side and protrudes toward the valve member 21 side along the entire circumference. The elastic seal member 23A of the main disk valve 23 is liquid-tightly fitted to an inner peripheral surface of this protrusion cylindrical portion 26D, and forms the pilot chamber 27 between the main disk valve 23 and the pilot body 26. An inner pressure in the pilot chamber 27 is applied to the main disk valve 23 in a valve-closing direction, i.e., in a direction causing the main disk valve 23 to be seated onto the annular seal member 21D of the valve member 21.

The valve seat portion 26E is provided at the other end side (the right end side in FIG. 2) of the bottom portion 26B of the pilot body 26 so as to surround the central hole 26C. The valve body 32, which will be described below, is seated on and separated from the valve seat portion 26E. An oil passage 26F is provided on an outer peripheral side of this valve seat portion 26E. The oil passage 26F axially penetrates through the bottom portion 26B. This oil passage 26F functions to release the oil fluid toward the valve body 32 side via a flexible disk 26G, when the inner pressure in the pilot chamber 27 excessively increases due to the valve-opening operation of the main disk valve 23.

Further, a return spring 28, a disk valve 29, a holding plate 30, and the like are arranged inside the cylindrical portion 26A of the pilot body 26. The return spring 28 biases the valve body 32 in a direction away from the valve seat portion 26E of the pilot body 26. The disk valve 29 forms a fail-safe valve when no power is supplied to the solenoid 33, which will be described below (when the valve body 32 is maximally separated from the valve seat portion 26E). The holding plate 30 includes an oil passage 30A formed on a central side thereof.

A pilot cap 31 is fixedly fitted at an opening end of the cylindrical portion 26A of the pilot body 26 with the return spring 28, the disk valve 29, the holding plate 30, and the like arranged inside this cylindrical portion 26A. Cutouts 31A are formed on this pilot cap 31 at, for example, four portions in the circumferential direction. The cutouts 31A form a flow passage that allows the oil fluid delivered to the solenoid 33 side via the oil passage 30A of the holding plate 30 to flow toward the oil chamber 19C (the reservoir chamber A side).

The valve body 32 is provided at one end portion, which is one end side corresponding to an anchor member 40 side of a shaft portion 44 of the solenoid 33, which will be described below, and forms a pilot valve together with the pilot body 26. The valve body 32 is generally cylindrically formed, and includes a gradually narrowing taper portion at a distal end portion thereof that is seated on and separated from the valve seat portion 26E of the pilot body 26. The valve body 32 is configured in such a manner that the shaft portion 44 is fixedly fitted inside the valve body 32, and a valve lift (a valve-opening pressure) of the valve body 32 is adjusted according to the power supply (a current value) to the solenoid 33 (the coil 39). A flange portion 32A, which serves as a spring bearing, is formed on a proximal end side (the solenoid 33 side) of the valve body 32 along the entire circumference. The flange portion 32A functions to form the fail-safe valve by abutting against the disk valve 29 when no power is supplied to the solenoid 33 (the coil 39), i.e., the valve body 32 is maximally separated from the valve seat portion 26E.

Next, the solenoid 33 forming the electromagnetic damping force adjustment device 17 together with the damping force adjustment valve 18 will be described with reference to FIGS. 2 and 3.

The solenoid 33 used as the damping force variable actuator (an electromagnetic actuator) of the electromagnetic damping force adjustment device 17 includes an overmold 34, the cylindrical case 36, a bobbin 38, the coil 39, the anchor member 40, an insert core 41, a cap member 42, the shaft portion 44, first and second bushes 45A and 45B, a back-pressure chamber formation member 46, a back-pressure chamber 47, and the like. This solenoid 33 is formed by, for example, a proportional solenoid.

The overmold 34 as a cover member serves as an outer shell of a distal end side (the other end side) of the solenoid 33, and contains the coil 39 therein. The overmold 34 is formed into a bottomed cylindrical shape as a whole with use of thermosetting resin or the like, and covers an outer peripheral side of the coil 39. This overmold 34 generally includes a cylindrical cylinder portion 34A and a cover portion 34B. The cylinder portion 34A covers the outer peripheral side of the coil 39. The cover portion 34B closes one end side (the right end side in FIG. 2) of this cylindrical portion 34A. A circumferential part of the cover portion 34B serves as a cable extraction portion 34C to which a cable 35 formed by a lead wire is connected.

The cylindrical case 36 serves as a circumferential outer shell of the solenoid 33, and contains the pilot body 26 and the coil 39 therein. This cylindrical case 36 generally includes a valve-side cylindrical portion 36A, a coil-side cylindrical portion 36B, and a flange portion 36C. The valve-side cylindrical portion 36A is positioned on an outer peripheral side of the pilot valve. The coil-side cylindrical portion 36B is positioned on an outer peripheral side of the cylindrical portion 34A of the overmold 34. The flange portion 36C is positioned between this valve-side cylindrical portion 36A and this coil-side cylindrical portion 36B, and protrudes radially inward along the entire circumference. The cylindrical case 36 is formed as a generally cylindrical yoke member with use of a magnetic body (a magnetic material), and establishes a magnetic passage when power is supplied.

The pilot cap 31 of the damping force adjustment valve 18 is fitted (internally fitted) on an inner diameter side of the valve-side cylindrical portion 36A, and the valve case 19 of the damping force adjustment valve 18 is fitted (externally fitted) on an outer diameter side of the valve-side cylindrical portion 36A. Then, a seal groove 36A1 is provided on an outer peripheral surface of the valve-side cylindrical portion 36A along the entire circumference. A seal ring 36A2 is attached in the seal groove 36A1, and this seal ring 36A2 liquid-tightly seals between the cylindrical case 36 and the valve case 19 of the damping force adjustment valve 18.

The cylindrical portion 34A of the overmold 34 is fitted (internally fitted) on an inner diameter side of the coil-side cylindrical portion 36B. Further, a ring-like member 36B1 and a seal ring 36B2 are provided between an inner peripheral surface of the coil-side cylindrical portion 36B on a distal end side (the other end side) thereof and an outer peripheral surface of the overmold 34. The ring-like member 36B1 prevents detachment between the cylindrical case 36 and the overmold 34. The seal ring 36B2 liquid-tightly seals between the cylindrical case 36 and the overmold 34.

A taper surface 36C1 is formed on an inner peripheral side of the flange portion 36C. The taper surface 36C1 is formed by a slope surface gradually reducing in diameter from one end side toward the other end side. Then, a cap member 42, which will be described below, is fitted on an inner peripheral side of the flange portion 36C. In this case, a seal ring 36C2 is provided between the taper surface 36C1 of the flange portion 36C and the cap member 42.

A coupling ring 37 is positioned on the other end side of the valve case 19 and is formed into a generally cylindrical shape. An outer peripheral-side engagement portion 37A and a flange portion 37B are provided inside the coupling ring 37. The outer peripheral-side engagement portion 37A is engaged with the inner-peripheral side engagement portion 19B of the valve case 19. The flange portion 37B has a smaller inner diameter dimension than an inner diameter dimension of the outer peripheral-side engagement portion 37A. The coupling ring 37 is a member for covering an engaged swaged portion between the inner peripheral-side engagement portion 19B of the valve case 19 and the cylindrical case 36 from outside to protect the engaged swaged portion. In other words, the coupling ring 37 is fixed due to the engagement of the outer peripheral-side engagement portion 37A with the inner peripheral-side engagement portion 19B.

The bobbin 38 is provided at a position on the inner peripheral side of the overmold 34. The bobbin 38 is made from a resin material such as thermosetting resin, and covers an inner peripheral side of the coil 39 (by molding formation). The other end side of the bobbin 38 is connected to the cable extraction portion 34C of the overmold 34. Further, the insert core 41, which will be described below, is embedded and sealed inside the bobbin 38.

The coil 39 is provided while being wound around the bobbin 38. This coil 39 is provided in such a manner that an outer peripheral side thereof is covered by the cylindrical portion 34A of the overmold 34 and the inner peripheral side thereof is covered by the bobbin 38. The coil 39 functions to generate a magnetic force by power supply (energization) through the cable 35.

The anchor member 40 is positioned on the inner peripheral sides of the cylindrical case 36 and the bobbin 38 (the coil 39), and is provided axially opposite from a movable iron core 43 as a fixed iron core. The anchor member 40 includes a cylindrical portion 40A and a flange portion 40B. The shaft portion 44 is inserted inside the cylindrical portion 40A. The flange portion 40B protrudes from an outer peripheral surface of this cylindrical portion 40A radially outward. This anchor member 40 functions to attract the movable iron core 43, which will be described below, when the magnetic force is generated by the coil 39. In this case, an outer peripheral surface of the flange portion 40B is configured to abut against an inner peripheral surface of the valve-side cylindrical portion 36A of the cylindrical case 36, and be able to achieve an efficient transfer of a magnetic flux between the flange portion 40B and the valve-side cylindrical portion 36A.

A bottomed hole portion 40C is provided on an end surface of the cylindrical portion 40A that faces the movable iron core 43. This movable iron core 43 is inserted in the bottomed hole portion 40C when this movable iron core 43 is attracted. Further, a bush fitting hole 40D is provided on an inner peripheral side of the anchor member 40. The first bush (a bearing) 45A supporting the shaft portion 44, which will be described below, is fittedly attached in the bush fitting hole 40D.

Now, the other end side (the right end side in FIG. 2) of the anchor member 40, which corresponds to the movable iron core 43 side, forms an annular conical portion 40E having an outer peripheral surface formed into a taper surface shape sloped in such a direction that an outer diameter dimension is increasing toward one end side (the flange portion 40B side and the left end side in FIG. 2). In other words, the conical portion 40E is formed on an outer peripheral side of the bottomed hole portion 40C. This conical portion 40E is used to generate a linear (straight-line) magnetic characteristic between the anchor member 40 and the movable iron core 43.

The insert core 41 is positioned inside the bobbin 38 and is provided over the inner peripheral side and the other end side of the coil 39. This insert core 41 is formed by a yoke made from a magnetic material, and includes a cylindrical portion 41A and a flange portion 41B. The movable iron core 43 is inserted inside the cylindrical portion 41A. The flange portion 41B protrudes from an outer peripheral surface of this cylindrical portion 41A radially outward. In this case, as illustrated in FIG. 2, an inner peripheral side of the cylindrical portion 41A that faces the movable iron core 43 is not sealed by the bobbin 38, and therefore forms a magnetic circuit that permits a transfer of the magnetic flux between the cylindrical portion 41A and the movable iron core 43.

A plurality of (for example, four) cutouts 41C is formed on the outer peripheral side of the flange portion 41B in the circumferential direction. The cutouts 41C are used to connect the cable 35 to the coil 39. The provision of these cutouts 41C brings about a function of improving entry of resin when the overmold 34 and the bobbin 38 are formed in addition to allowing the cable 35 to pass therethrough. In this case, the solenoid 33 is configured in such a manner that an outer peripheral surface of the flange portion 41B is in abutment with the inner peripheral surface of the coil-side cylindrical portion 36B of the cylindrical portion 36 at a portion where the cutouts 41C are not formed, and an efficient transfer of the magnetic fluid can be achieved between the flange portion 41B and the coil-side cylindrical portion 36B.

The cap member 42 is positioned on the inner peripheral side of the coil 39 (the bobbin 38), and is provided so as to surround the anchor member 40, the movable iron core 43, the back-pressure chamber formation member 46, and the like. This cap member 42 is formed into a bottomed stepped cylindrical shape with use of a thin plate made from a non-magnetic material, and includes a bottom portion 42A, first and second cylindrical portions 42B and 42C, a taper portion 42D, and a flange portion 42E. The cap member 42 functions to establish liquid-tightness inside the solenoid 33, thereby preventing the oil fluid in the damping force adjustment valve 18 from flowing outward.

The bottom portion 42A of the cap member 42 is positioned on the inner peripheral side of the cover portion 34B of the overmold 34, and functions to close the other end side of the cap member 42. Further, the first cylindrical portion 42B is provided at a position on the outer peripheral sides of the movable iron core 43 and the back-pressure chamber formation member 46, and the second cylindrical portion 42C is provided at a position on the outer peripheral side of the anchor member 40. In this case, the cap member 42 is formed in such a manner that an outer diameter of the second cylindrical portion 42C is larger than an outer diameter of the first cylindrical portion 42B, and the first cylindrical portion 42B and the second cylindrical portion 42C are connected to each other via the taper portion 42D therebetween. This taper portion 42D forms a slope surface so as to comply with the slope of the conical portion 40E of the anchor member 40. One end side of the second cylindrical portion 42C is bent radially outward, by which the flange portion 42E is provided between the flange portion 36C of the cylindrical case 36 and the flange portion 40B of the anchor member 40.

The movable iron core 43 is disposed on the inner peripheral sides of the coil 39 and the cap member 42, and is provided as an axially movable iron core by being fixed integrally to the shaft portion 44. The movable iron core 43 is formed into a generally cylindrical shape with use of, for example, a ferrous magnetic body, and functions to generate a thrust force by being attracted by the anchor member 40 when the magnetic force is generated by the coil 39. The movable iron core 43 includes a thick cylindrical portion 43A and a taper cylindrical portion 43B. The thick cylindrical portion 43A is positioned on the anchor member 40 side, and axially faces the anchor member 40. The taper cylindrical portion 43B is positioned on the back-pressure chamber formation member 46 side, which will be described below, and axially faces the back-pressure chamber formation member 46.

The thick cylindrical portion 43A of the movable iron core 43 is formed as an annular plate portion having an inner diameter corresponding to an outer diameter of the shaft portion 44, and an outer diameter slightly smaller than an inner diameter of the cap member 42 (the second cylindrical portion 42C). A fixation hole 43A1, in which the shaft portion 44 is fixed by a method such as press-fitting, is formed on the inner peripheral side of the thick cylindrical portion 43A, and extends while penetrating in an axial direction of the movable iron core 43. Further, a recessed portion 43A2 is formed around this fixation hole 43A1 while being radially recessed. This recessed portion 43A2 is a flow hole that permits a flow of the oil fluid in the cap member 42 to axially flow in the thick cylindrical portion 43A when the movable iron core 43 is displaced in the cap member 42 (the second cylindrical portion 42C) together with the shaft portion 44.

Figure 4:
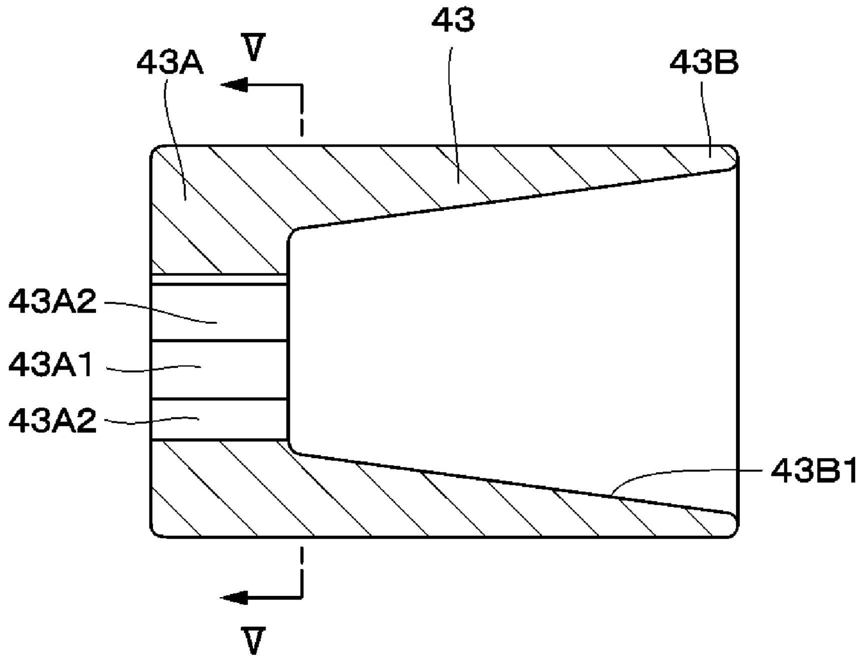
FIG. 4 is a cross-sectional view illustrating a movable iron core in FIG. 2 by itself.
Figure 5:
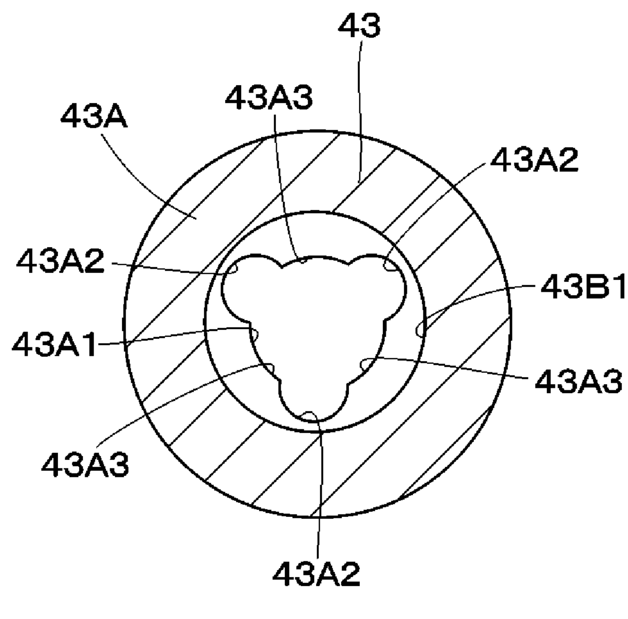
FIG. 5 is a cross-sectional view of the movable iron core as viewed from a V-V direction indicated by arrows in FIG. 4.

More specifically, as illustrated in FIGS. 4 and 5, an odd number of recessed portions 43A2 (for example, three reassessed portions 43A2) are formed at even intervals in a circumferential direction of the fixation hole 43A1. Further, each of the recessed portions 43A2 is disposed at a position not opposite from each other in a radial direction of the fixation hole 43A1 (a 180-degree direction). These recessed portions 43A2 function to permit a flow of the oil fluid in the axial direction of the movable iron core 43 (the thick cylindrical portion 43A) so as to prevent a flow passage resistance from being generated in the oil fluid in the solenoid 33 against the displacement of the movable iron core 43. In this case, portions positioned around (on an outer periphery of) the fixation hole 43A1 and provided between the individual recessed portions 43A2 form non-recessed portions 43A3 to which the shaft portion 44 is fixed in a press-fitted state.

The taper cylindrical portion 43B defines a taper surface 43B1 formed by axially extending from the thick cylindrical portion 43A toward the back-pressure chamber formation member 46 side and having an inner peripheral surface flaring so as to define a taper shape. This taper surface 43B1 flares while being sloped in such a direction that an inner diameter dimension thereof increases from one side toward the other side. In this case, a thickness of an end of the taper cylindrical portion 43B on the back-pressure chamber 47 side is set to, for example, a thickness equal to or thinner than a half of a thickness of the thick cylindrical portion 43A.

The shaft portion 44 is provided so as to axially extend on the inner peripheral sides of the anchor member 40, the movable iron core 43, and the back-pressure chamber formation member 46. Both axial sides of the shaft portion 44 are axially displaceably supported by the anchor member 40 and the back-pressure chamber formation member 46 via the first and second bushes 45A and 45B. With the movable iron core 43 integrally fixed (sub-assembled) to an intermediate portion of the shaft portion 44 with use of a method such as press-fitting, the shaft portion 44 functions to transmit the thrust force of the movable iron core 43 to the valve body 32 by being displaced integrally with the movable iron core 43. Now, a communication passage 44A is provided on the inner peripheral side of the shaft portion 44. The communication passage 44A is formed by an axial hole that axially penetrates through the shaft portion 44 to establish communication between the valve body 32 side forming the pilot valve and the back-pressure chamber formation member 46.

One end side (the left end side in FIG. 2) of the shaft portion 44 protrudes from the anchor member 40, and the valve body 32 of the damping force adjustment valve 18 is fixed at a protrusion end thereof. Therefore, the valve body 32 is moved (displaced) integrally with the movable iron core 43 and the shaft portion 44. In other words, the valve body 32 operates with a valve lift or a valve-opening pressure corresponding to the thrust force of the movable iron core 43 based on the power supply to the coil 39. Due to this mechanism, the movable iron core 43 is configured to open/close the valve body 32 from and to the pilot valve of the damping force adjustment valve 18, i.e., the valve seat portion 26E of the pilot valve 26 due to the axial movement thereof.

The first bush 45A is positioned on the inner peripheral side of the anchor member 40 and provided in the bush fitting hole 40D, and supports the one end side of the shaft portion 44 as a bearing. Further, the second bush 45B is positioned on the inner peripheral side of the back-pressure chamber formation member 46, which will be described below, and provided in a bush fitting hole 46C, and supports the other end side, which is the other end portion side of the shaft portion 44, as a bearing. In other words, the first bush 45A and the second bush 45B are each provided so as to sandwich the movable iron core 43 therebetween. The shaft portion 44 is axially displaceably guided by these first and second bushes 45A and 45B. The first bush 45A is provided on the inner peripheral side of the anchor member 40 in the present embodiment, but may be provided on, for example, an end of the anchor member 40 without being limited to being provided on the inner periphery of the anchor member 40.

The back-pressure chamber formation member 46 is fitted to an inner periphery of the other end side (the bottom portion 42A side) of the cap member 42, and is provided so as to cover the other end of the shaft portion 44 (an end portion opposite of the movable iron core 43 from the anchor member 40). This back-pressure chamber formation member 46 is formed into a bottomed stepped cylindrical shape with use of a non-magnetic body (a non-magnetic material), and generally includes a bottom portion 46A and a cylindrical portion 46B. Further, the bush fitting hole 46C is provided on the inner peripheral side of the back-pressure chamber formation member 46. The second bush 45B, which supports the shaft portion 44, is fitted in the bush fitting hole 46C.

The back-pressure chamber formation member 46 forms therein the back-pressure chamber 47 into which the oil fluid flows, and functions to reduce a pressure-receiving surface of the valve body 32 with the oil fluid filling the inside of the back-pressure chamber 47. More specifically, the back-pressure chamber 47 is formed by a space defined by the end portion of the shaft portion 44 on the other end side, the inner peripheral surface of the second bush 45B (the inner peripheral surface of the cylindrical portion 46B), and the inner peripheral surface of the bottom portion 46A of the back-pressure chamber formation member 46. In this case, the back-pressure chamber 47 has a smaller pressure-receiving area than a pressure-receiving area over which the valve body 32 receives a hydraulic force between the valve body 32 and the valve seat portion 26E as illustrated in FIG. 3.

The electromagnetic damping force adjustment device 17 and the shock absorber 1 with this electromagnetic damping force adjustment device 17 installed therein are configured in the above-described manner. Next, an operation thereof will be described.

First, when the shock absorber 1 is mounted on the vehicle such as the automobile, for example, the upper end side of the piston rod 8 is attached to the vehicle body side of the vehicle, and the mounting eye 3A side provided on the bottom cap 3 is attached to the wheel side. Further, the cable 35 of the solenoid 33 is connected to a controller (not illustrated) or the like of the vehicle.

When the vehicle is running, upon occurrence of a vertical vibration due to unevenness of a road surface or the like, the piston rod 8 is displaced so as to be extended and compressed from and into the outer cylinder 2, and therefore can generate the damping force by the electromagnetic damping force adjustment device 17 or the like, thereby absorbing the vibration of the vehicle. At this time, the damping force to be generated by the shock absorber 1 (the damping force adjustment valve 18) can be variably adjusted by controlling the value of the current to be supplied to the coil 39 of the solenoid 33 with use of the controller to thus adjust the valve lift (the vale-opening pressure) of the valve body 32.

For example, during the extension stroke of the piston 8, the compression-side check valve 7 of the piston 5 is closed due to the movement of the piston 5 in the inner cylinder 4. Before the disk valve 6 of the piston 5 is opened, the oil fluid in the rod-side chamber B is pressurized, thereby flowing into the oil passage 20B of the cylindrical holder 20 of the damping force adjustment valve 18 via the oil holes 4A of the inner cylinder 4, the annular chamber D, and the connection port 12C of the intermediate cylinder 12. At this time, the oil fluid flows from the reservoir chamber A into the bottom-side chamber C by opening the extension-side check valve 16 of the bottom valve 13 by an amount corresponding to the movement of the piston 5. When the pressure in the rod-side chamber B reaches the valve-opening pressure of the disk valve 6, this disk valve 6 is opened and relieves the pressure in the rod-side chamber B by releasing it into the bottom-side chamber C.

In the electromagnetic damping force adjustment device 17, before the main disk valve 23 is opened (in a low piston speed region), the oil transmitted into the oil passage 20B of the cylindrical holder 20 is delivered into the pilot body 26 by passing through the central hole 21A of the valve member 21, the central hole 24B of the pilot pin 24, and the central hole 26C of the pilot body 26, and pushing and opening the valve body 32 by an extremely small valve lift as indicated by an arrow X in FIG. 3. Then, the oil fluid delivered into the pilot body 26 is introduced into the reservoir chamber A by passing through between the flange portion 32A of the valve body 32 and the disk valve 29, the oil passage 30A of the holding plate 30, the cutouts 31A of the pilot cap 31, and the oil chamber 19C of the valve case 19.

Then, when the pressure in the oil passage 20B of the cylindrical holder 20, i.e., the pressure in the rod-side chamber B reaches the valve-opening pressure of the main disk valve 23 according to an increase in a piston speed, the oil fluid delivered into the oil passage 20B of the cylindrical holder 20 is introduced into the reservoir chamber A by passing through the oil passage 21B of the valve member 21, pushing and opening the main disk valve 23, and passing through the oil chamber 19C of the valve case 19, as indicated by an arrow Y in FIG. 3.

On the other hand, during the compression stroke of the piston rod 8, the compression-side check valve 7 of the piston 5 is opened and the extension-side check valve 16 of the bottom valve 13 is closed due to the movement of the piston 5 in the inner cylinder 4. Before the bottom valve 13 (the disk valve 15) is opened, the oil fluid in the bottom-side chamber C is transmitted into the rod-side chamber B. Along therewith, the oil fluid flows from the rod-side chamber B into the reservoir chamber A via the damping force adjustment valve 18 by passing through a similar route to the above-described extension stroke by an amount corresponding to the entry of the piston rod 8 into the inner cylinder 4. When the pressure in the bottom-side chamber C reaches a valve-opening pressure of the bottom valve 13 (the disk valve 15), the bottom valve 13 (the disk valve 15) is opened and relieves the pressure in the bottom-side chamber C by releasing it into the reservoir chamber A.

As a result, during the extension stroke and the compression stroke of the piston rod 8, the damping force is generated according to the valve lift of the valve body 32 before the main disk valve 23 of the damping force adjustment valve 18 is opened (in the low piston speed region), and is generated according to the valve lift of the main disk valve 23 after this main disk valve 23 is opened (in a high piston speed region). In this case, the valve lift of the valve body 32 is variably controlled in the following manner by adjusting the magnetic force (the thrust force) that the movable iron core 43 is caused to generate with use of the power supply to the coil 39 of the solenoid 33.

That is, reducing the current applied to the coil 39 to reduce the thrust force of the movable iron core 43 leads to an increase in the valve lift of the valve body 32, thereby resulting in generation of a soft-side damping force. At this time, the damping force can also be generated by the orifice 24C of the pilot pin 24. On the other hand, increasing the current applied to the coil 39 to increase the thrust force of the movable iron core 43 leads to a reduction in the valve lift of the valve body 32, thereby resulting in generation of a hard-side damping force. At this time, the change in the valve lift of the valve body 32 causes a change according thereto in the inner pressure in the pilot chamber 27 in communication via the oil passage 25 on the upstream side thereof.

In this manner, by variably controlling the valve lift of the valve body 32, the valve-opening pressure of the main disk valve 23 can be adjusted at the same time, and therefore a damping force characteristic can be adjusted in a wider range. In this case, the oil fluid in the cap member 42 flows in the plurality of recessed portions 43A2 provided on the thick cylindrical portion 43A of the movable iron core 43 according to the displacement of the movable iron core 43.

In a case where the thrust force of the movable iron core 43 is lost due to, for example, disconnection of the coil 39, as illustrated in FIG. 2, the valve body 32 is retracted (displaced in the direction away from the valve seat portion 26E) by the return spring 28, and the flange portion 32A of the valve body 32 and the disk valve 29 abut against each other. In this state, the damping force can be generated due to the valve opening of the disk valve 29, and a necessary damping force can be acquired even at the time of a malfunction such as the disconnection of the coil.

Then, as illustrated in FIG. 3, the oil fluid in the pilot pin 24 positioned on the upstream side of the valve body 32 flows into the back-pressure chamber 47 via the communication passage 44A of the shaft portion 44 with the valve body 32 seated on the valve seat portion 26E due to the power supply to the solenoid 33 (the coil 39) (i.e., when the valve body 32 is closed). Then, a hydraulic pressure is generated on the other end surface of the shaft portion 44 in a direction pushing the shaft portion 44 from the other end side toward the one side due to the oil fluid filling the inside the back-pressure chamber 47. As a result, the valve body 32 bears the hydraulic force on the upstream side (the pilot pin 24 side) over a pressure-receiving area as wide as an area calculated by subtracting a cross-sectional area of the shaft portion 44 from an area of the valve body 32 that faces the valve seat portion 26E.

Further, the magnetic force (the magnetic flux) generated by the coil 39 travels in an order of the coil-side cylindrical portion 36B of the cylindrical case 36, the abutment portion between the coil-side cylindrical portion 36B of the cylindrical case 36 and the flange portion 41B of the insert core 41, the insert core 41, the movable iron core 43, the conical portion 40E of the anchor member 40 from the movable iron core 43, the anchor member 40, and the abutment portion between the flange portion 40B of the anchor member 40 and the valve-side cylindrical portion 36A of the cylindrical case 36, as indicated by an arrow M in FIG. 3.

In this case, the back-pressure chamber formation member 46 is made from the non-magnetic body, so that the magnetic force generated when power is supplied to the coil 39 is prevented from traveling around to the back-pressure chamber formation member 46 and therefore can be transmitted to the movable iron core 43 via the insert core 41. Further, the flow of the magnetic flux indicated by the arrow M in FIG. 3 allows the magnetic flux to be smoothly transferred because of a small space between the individual members.

In this manner, according to the present embodiment, the shock absorber 1 is configured in such a manner that the taper cylindrical portion 43B, where the inner peripheral surface of the movable iron core 43 flares so as to define the taper shape, is formed on the back-pressure chamber formation member 46 side of the movable iron core 43. Due to this configuration, the shock absorber 1 can be reduced in weight by including the hollow movable iron core 43, even when the axial dimension of the movable iron core 43 increases to secure the area over which the magnetic flux is transferred. Further, due to the taper cylindrical portion 43B, the shock absorber 1 can include the hollow movable iron core 43 without reducing the outer peripheral-side area of the movable iron core 43, thereby securing the area over which the magnetic flux flows. As a result, even when the cap member 42 is provided in the solenoid 33, the shock absorber 1 can reduce the resistance when the movable iron core 43 is axially displaced due to the reduction in the weight while securing the area over which the magnetic flux flows, thereby securing the thrust force when the movable iron core 43 is displaced and thus achieving an excellent dynamic characteristic of the movable iron core 43.

In addition, according to the present embodiment, the shock absorber 1 is configured in such a manner that, for example, the three recessed portions 43A2 are provided at the thick cylindrical portion 43A of the movable iron core 43 around the fixation hole 43A1 to which the shaft portion 44 is fixed. Due to this configuration, because the oil fluid flows via each of the recessed portions 43A2 when the movable iron core 43 is displaced, the shock absorber 1 can secure the flow passage area when the movable iron core 43 is displaced to compensate for a volume, thereby preventing or reducing an orifice function (damping) due to the flow of the oil fluid. In this case, because the recessed portions 43A2 are provided closer to the inner peripheral side of the thick cylindrical portion 43A, the shock absorber 1 can cause the oil fluid to flow without reducing the area of the outer peripheral side of the movable iron core 43 (the thick cylindrical portion 43A) (i.e., a magnetic flux density). As a result, the shock absorber 1 can secure the thrust force when the movable iron core 43 is displaced, thereby achieving the excellent dynamic characteristic when the movable iron core 43 is displaced.

Especially, according to the present embodiment, the shock absorber 1 is configured to include the three recessed portions, which is the plurality of recessed portions, as the recessed portions 43A2 of the movable iron core 43. Due to this configuration, the shock absorber 1 can sufficiently secure the flow passage area over which the oil fluid flows to prevent or reduce the damping of the movable iron core 43, thereby achieving the excellent dynamic characteristic when the movable iron core 43 is displaced.

Further, the shock absorber 1 is configured in such a manner that the recessed portions 43A2 of the movable iron core 43 are disposed at the positions not opposite from each other in the radial direction of the fixation hole 43A1. Due to this configuration, the shock absorber 1 can prevent the shaft portion 44 from tilting in any one of directions in the radial direction in the fixation hole 43A1 of the movable iron core 43 when the shaft portion 44 and the movable iron core 43 are swaged. As a result, the shock absorber 1 can prevent or reduce a variation in the thrust force of the movable iron core 43.

Further, the shock absorber 1 is configured to include the odd number of recessed portions 43A2 of the movable iron core 43. Due to this configuration, the shock absorber 1 allows each of the recessed portions 43A2 to be easily disposed at the position not opposite from each other in the radial direction of the fixation hole 43A1.

Further, the shock absorber 1 is configured in such a manner that the bottomed cylindrical cap member 42 is disposed on the inner peripheral side of the coil 39 of the solenoid 33, and the back-pressure chamber formation member 46, the movable iron core 43, and the anchor member 40 are disposed in this cap member 42. Due to this configuration, the shock absorber 1 can easily maintain the liquid-tightness inside the solenoid 33.

Further, because the hydraulic force in the cap member 42 is mainly borne by the anchor member 40, the movable iron core 43, the back-pressure chamber formation member 46, and the like, the shock absorber 1 can eliminate or reduce a necessity of directly bearing the hydraulic force in the solenoid 33 by the cap member 42. Therefore, the shock absorber 1 can reduce the hydraulic force borne by the cap member 42, thereby reducing (thinning) a thickness dimension of the cap member 42 and thus achieving the reduction in the weight. As a result, the shock absorber 1 can reduce the magnetic resistance of the cap member 42, thereby transmitting the magnetic flux from the insert core 41 to the movable iron core 43 via the cap member 42 with high magnetic efficiency.

Further, the shock absorber 1 is configured in such a manner the non-recessed portions 43A3 of the fixation hole 43A1 of the movable iron core 43 are fixed to the shaft portion 44. Due to this configuration, the shock absorber 1 can fix the shaft portion 44 with use of the non-recessed portions 43A3 (i.e., the fixation hole 43A1) while securing the flow passage area of the recessed portions 43A2 over which the oil fluid flows. As a result, the shock absorber 1 can prevent or reduce a tilt of the shaft portion 44 with respect to the movable iron core 43 and thus prevent the variation in the thrust force of the movable iron core 43, thereby improving a quality of the electromagnetic damping force adjustment device 17, i.e., the shock absorber 1.

Now, in the solenoid 33 according to the present embodiment, the magnetic flux density tends to increase between the insert core 41 and the movable iron core 43, and reduce between the movable iron core 43 and the anchor member 40 because the space therebetween is large compared to between the insert core 41 and the movable iron core 43. In this case, according to the present embodiment, the thickness of the taper cylindrical portion 43B on the back-pressure chamber 47 side is set to the thickness equal to or thinner than the half of the thickness of the thick cylindrical portion 43A. Due to this configuration, the shock absorber 1 allows the movable iron core 43 to have a thickness that is thin at the portion thereof where the magnetic flux density is high and increases toward the portion thereof where the magnetic flux density is low, and therefore can maintain a magnetic characteristic by preventing or cutting down a reduction in the magnetic flux density. As a result, the shock absorber 1 can secure the thrust force when the movable iron core 43 is displaced, thereby maintaining the dynamic characteristic when the movable iron core 43 is displaced.

Figure 6:
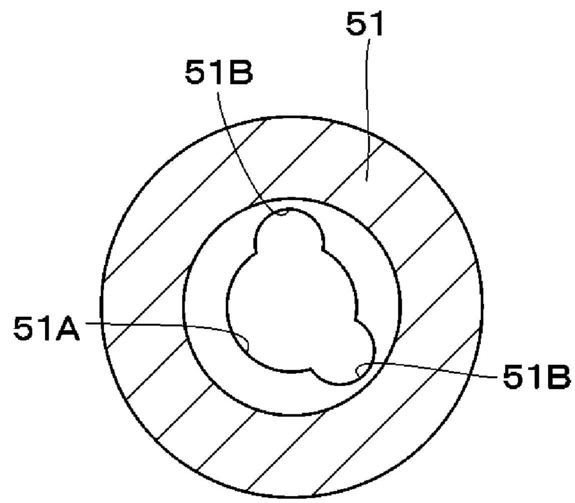
FIG. 6 is a cross-sectional view illustrating a movable iron core according to a first modification.

In the above-described embodiment, the shock absorber 1 has been described referring to the example in which the three recessed portions 43A2 are provided on the fixation hole 43A1 of the movable iron core 43. However, the present invention is not limited thereto, and the shock absorber 1 may be configured in such a manner that, for example, two recessed portions 51B are provided around a fixation hole 51A of a movable iron core 51 like a first modification illustrated in FIG. 6. In this case, each of the recessed portions 51B is disposed at a position not opposite from each other in a radial direction of the fixation hole 51A.

Figure 7:
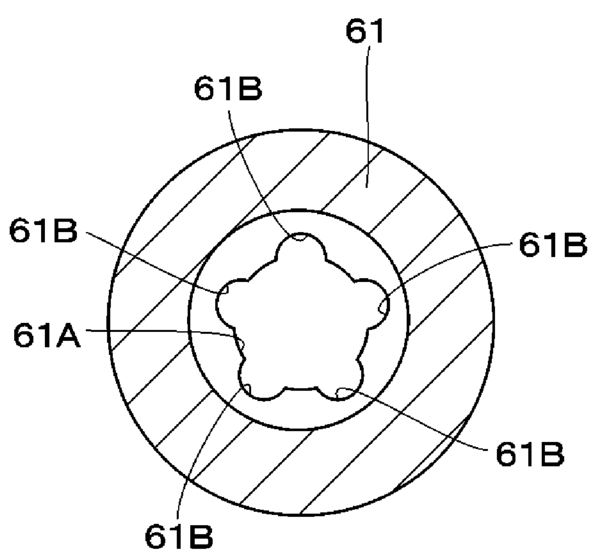
FIG. 7 is a cross-sectional view illustrating a movable iron core according to a second modification.

Alternatively, the shock absorber 1 may be configured in such a manner that, for example, five recessed portions 61B are provided around a fixation hole 61A of a movable iron core 61 like a second modification illustrated in FIG. 7. In this case, each of the recessed portions 61B is disposed at a position not opposite from each other in a radial direction of the fixation hole 61A.

Figure 8:
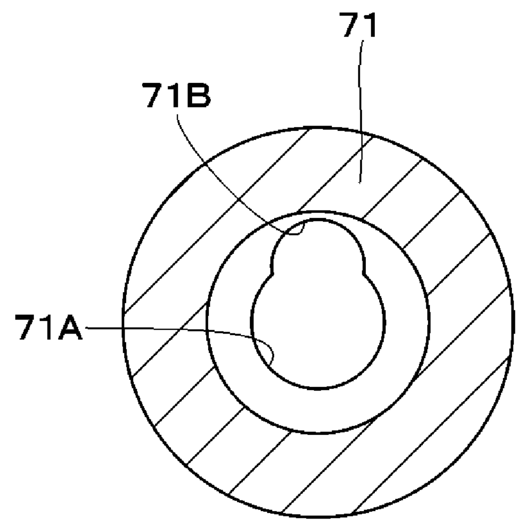
FIG. 8 is a cross-sectional view illustrating a movable iron core according to a third modification.
Figure 9:
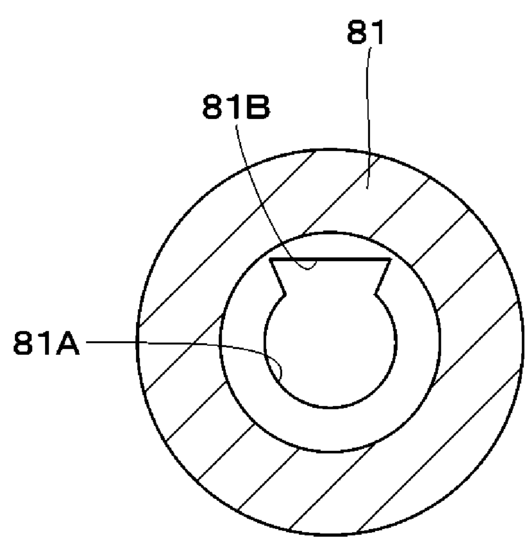
FIG. 9 is a cross-sectional view illustrating a movable iron core according to a fourth modification.

Alternatively, the shock absorber 1 may be configured in such a manner that, for example, one recessed portion 71B is provided around a fixation hole 71A of a movable iron core 71 like a third modification illustrated in FIG. 8. In this case, an area of the recessed portion 71B is set to a flow passage area corresponding to, for example, a sum of the areas of the above-described three recessed portions 43A2 to ensure a sufficient flow of the oil fluid. Alternatively, the shock absorber 1 may be configured in such a manner that, for example, one or more non-circular (for example, rectangular or triangular) recessed portion(s) 81B is(are) provided around a fixation hole 81A of a movable iron core 81 like a fourth modification illustrated in FIG. 9.

Further, in the above-described embodiment, the shock absorber 1 has been described referring to the example in which the solenoid 33 is configured as the proportional solenoid. However, the present invention is not limited thereto, and, the solenoid 33 may be configured as, for example, an ON/OFF solenoid.

Further, in the above-described embodiment, the shock absorber 1 has been described as the configuration including the end portion of the shaft portion 44 positioned on the opposite side of the movable iron core 43 from the fixed iron core 40, the back-pressure chamber 47 formed between this end portion and the back-pressure chamber formation member 46 formed so as to cover this end portion, and the second bearing 45B provided between the inner peripheral side of the back-pressure chamber formation member 46 and the movable iron core 43 and axially displaceably supporting the shaft portion 44. However, the present invention is not limited thereto, and the shock absorber 1 may be configured in such a manner that the shaft portion 44 is supported by the movable iron core 43 and the first bearing 45A without use of the back-pressure chamber formation member 46, the back-pressure chamber 47, and the second bearing 45B.

Further, in the above-described embodiment, the shock absorber 1 has been described referring to the example in which the shock absorber 1 is constructed with use of the twin-tube cylinder including the outer cylinder 2 and the inner cylinder 4. However, the present invention is not limited thereto, and may be applied to, for example, a shock absorber constructed with use of a single-tube cylinder.

Next, inventions included in the above-described embodiment will be described below. That is, in the present invention, the thick cylindrical portion includes the recessed portion positioned around the fixation hole and formed so as to be radially recessed. The recessed portion extends while penetrating in the axial direction the movable iron core. The recessed portion is configured to allow the hydraulic fluid to axially flow. Due to this configuration, the damping force adjustable shock absorber can cause the hydraulic fluid to flow via the recessed portion, thereby achieving the excellent dynamic characteristic when the movable iron core is displaced.

Further, the damping force adjustable shock absorber is configured in such a manner that the plurality of recessed portions is provided on the thick cylindrical portion, and each of the recessed portions is disposed at the position not opposite from each other in the radial direction of the fixation hole. Due to this configuration, the damping force adjustable shock absorber can sufficiently secure the flow passage area over which the oil fluid flows, and prevent the shaft portion from tilting in any one side in the radial direction in the fixation hole of the movable iron core.

Further, the damping force adjustable shock absorber is configured in such a manner that the odd number of recessed portions are provided. Due to this configuration, the damping force adjustable shock absorber allows each of the recessed portions to be easily disposed at the position not opposite from each other in the radial direction of the fixation hole.

Further, the damping force adjustable shock absorber is configured in such a manner that the back-pressure chamber formation member, the movable iron core, and the fixed iron core are provided in the bottomed cylindrical cap member disposed on the inner peripheral side of the coil. Due to this configuration, the damping force adjustable shock absorber can easily maintain the liquid-tightness inside the solenoid.

Further, the damping force adjustable shock absorber is configured in such a manner the non-recessed portion of the fixation hole is fixed to the shaft portion. Due to this configuration, the damping force adjustable shock absorber can fix the shaft portion with use of the non-recessed portion while securing the flow passage area of the recessed portion over which the oil fluid flows.

Further, the damping force adjustable shock absorber is configured in such a manner that the thickness of the taper cylindrical portion on the back-pressure chamber side is equal to or thinner than a half of the thickness of the thick cylindrical portion. Due to this configuration, the damping force adjustable shock absorber allows the movable iron core to have a thickness that is thin at the portion thereof where the magnetic flux density is high and increases toward the portion thereof where the magnetic flux density is low.

Examples of possible configurations as the damping force adjustable shock absorber based on the above-described embodiment include the following configurations.

As a first configuration, a damping force adjustable shock absorber includes a cylinder sealingly containing hydraulic fluid therein, a piston inserted in the cylinder and dividing an inside of the cylinder into a rod-side chamber and a bottom-side chamber, a piston rod having one side coupled with the piston and the other side extending out of the cylinder, a flow passage configured to cause the hydraulic fluid to flow therethrough due to extension and compression of the piston rod, and a damping force adjustment valve provided in the flow passage and configured to be driven by a solenoid. The solenoid includes a coil configured to generate a magnetic force by power supply, a movable iron core located on an inner peripheral side of the coil and provided axially movably, a fixed iron core located so as to axially face the movable iron core and provided on the inner peripheral side of the coil, a bottomed cylindrical overmold covering an outer periphery of the coil, and a shaft portion provided so as to axially extend on inner peripheral sides of the movable iron core and the fixed iron core and configured to be displaced integrally with the movable iron core. A valve body of the damping force adjustment valve is provided on one end portion of the shaft portion on the fixed iron core side. A communication passage is provided on the shaft portion. The communication passage extends while axially penetrating. The communication passage establishes communication between the valve body side and the other end portion side of the shaft portion positioned on an opposite side of the movable iron core from the fixed iron core. The movable iron core includes a thick cylindrical portion and a taper cylindrical portion. The thick cylindrical portion axially faces the fixed iron core and has a fixation hole on an inner peripheral side thereof. The shaft portion is fixed in the fixation hole. The taper cylindrical portion axially extends from this thick cylindrical portion toward the other end portion side of the shaft portion, and has an inner peripheral surface flaring so as to define a taper shape.

As a second configuration, the damping force adjustable shock absorber according to the first configuration further includes, on the other end portion of the shaft portion, a back-pressure chamber formed between a back-pressure chamber formation member formed so as to cover this other end portion, and this other end portion, and a first bearing and a second bearing provided on an inner peripheral side of the back-pressure chamber formation member and the fixed iron core side opposite of the movable iron core therefrom, respectively. The first and second bearings axially displaceably support the shaft portion.

As a third configuration, in the damping force adjustable shock absorber according to the first or second configuration, the thick cylindrical portion includes a recessed portion positioned around the fixation hole and formed so as to be radially recessed. The recessed portion extends while penetrating in an axial direction of the movable iron core. The recessed portion is configured to allow the hydraulic fluid to axially flow.

As a fourth configuration, in the damping force adjustable shock absorber according to the third configuration, a plurality of recessed portions are provided on the thick cylindrical portion. Each of the recessed portions is disposed at a position not opposite from each other in a radial direction of the fixation hole.

As a fifth configuration, in the damping force adjustable shock absorber according to the third or fourth configuration, an odd number of recessed portions are provided on the thick cylindrical portion.

As a sixth configuration, in the damping force adjustable shock absorber according to any of the third to fifth configurations, the back-pressure chamber formation member, the movable iron core, and the fixed iron core are provided in a bottomed cylindrical cap member disposed on the inner peripheral side of the coil.

As a seventh configuration, in the damping force adjustable shock absorber according to the third configuration, a non-recessed portion of the fixation hole is fixed to the shaft portion.

As an eighth configuration, in the damping force adjustable shock absorber according to the second configuration, a thickness of the taper cylindrical portion on the back-pressure chamber side is equal to or thinner than a half of a thickness of the thick cylindrical portion.

Having described merely several embodiments of the present invention, it is apparent to those skilled in the art that the embodiments described as the examples can be modified or improved in various manners without substantially departing from the novel teachings and advantages of the present invention. Therefore, such a modified or improved embodiment is intended to be also contained in the technical scope of the present invention. The features of the above-described embodiments may also be arbitrarily combined.

The present application claims priority under the Paris Convention to Japanese Patent Application No. 2016-125559 filed on Jun. 24, 2016. The entire disclosure of Japanese Patent Application No. 2016-125559 filed on Jun. 24, 2016 including the specification, the claims, the drawings, and the abstract is incorporated herein by reference in its entirety.

REFERENCE SIGN LIST

1 damping force adjustable hydraulic shock absorber
2 outer cylinder (cylinder)
4 inner cylinder (cylinder)
8 piston rod
18 damping force adjustment valve
32 valve body
33 solenoid
34 overmold
39 coil
40 anchor member (fixed iron core)
42 cap member
43, 51, 61, 71, 81 movable iron core
43A thick cylindrical portion

43A1, 51A, 61A, 71A, 81A fixation hole
43A2, 51B, 61B, 71B, 81B recessed portion
43A3 non-recessed portion
43B taper cylindrical portion
44 shaft portion
44A communication passage
45A first bush
45B second bush
46 back-pressure chamber formation member
47 back-pressure chamber
B rod-side chamber
C bottom-side chamber
D annular chamber (flow passage)

The invention claimed is:

1. A damping force adjustable shock absorber comprising:

a cylinder sealingly containing hydraulic fluid therein;

a piston inserted in the cylinder and dividing an inside of the cylinder into a rod-side chamber and a bottom-side chamber;

a piston rod having one side coupled with the piston and the other side extending out of the cylinder;

a flow passage configured to cause the hydraulic fluid to flow therethrough due to extension and compression of the piston rod; and a damping force adjustment valve provided in the flow passage and configured to be driven by a solenoid, wherein the solenoid includes a coil configured to generate a magnetic force by power supply, a movable iron core located on an inner peripheral side of the coil and provided axially movably, a fixed iron core located so as to axially face the movable iron core and provided on the inner peripheral side of the coil, and a shaft portion provided so as to axially extend on inner peripheral sides of the movable iron core and the fixed iron core and configured to be displaced integrally with the movable iron core, wherein a valve body of the damping force adjustment valve is provided on one end portion of the shaft portion on the fixed iron core side, wherein the fixed iron core includes an annular conical portion on the movable iron core side, the annular conical portion having an outer peripheral surface formed into a taper surface shape sloped in such a direction that an outer diameter dimension is increasing toward the fixed iron core side, wherein the movable iron core includes a thick cylindrical portion and a taper cylindrical portion, the thick cylindrical portion axially facing the fixed iron core, the taper cylindrical portion axially extending from the thick cylindrical portion toward the other end portion side of the shaft portion and having an inner peripheral surface flaring so as to define a taper shape, wherein a bottomed hole portion is provided on an end surface of the fixed iron core that faces the movable iron core, and the movable iron core is inserted in the bottomed hole portion when the movable iron core is attracted, wherein the conical portion is formed on an outer peripheral side of the bottomed hole portion, wherein the movable iron core further includes a fixation hole on an inner peripheral side thereof, the shaft portion being fixed in the fixation hole, and wherein the thick cylindrical portion includes a recessed portion positioned around the fixation hole and formed so as to be radially recessed such that the recessed portion is radially open to the fixation hole, the recessed portion extending through the movable iron core in an axial direction of the movable iron core.

2. The damping force adjustable shock absorber according to claim 1, wherein a core is provided radially between the coil and the movable iron core, and wherein the core and the movable iron core axially overlap each other.

3. The damping force adjustable shock absorber according to claim 1, further comprising a bottomed cylindrical overmold covering an outer peripheral side of the coil, wherein a communication passage is provided on the shaft portion, and the communication passage extends through the shaft portion in an axial direction of the shaft portion, and wherein the communication passage establishes communication between the valve body side and the other end portion side of the shaft portion positioned on an opposite side of the movable iron core from the fixed iron core.

4. The damping force adjustable shock absorber according to claim 1, further comprising, on the other end portion of the shaft portion, a back-pressure chamber formed between a back-pressure chamber formation member formed so as to cover the other end portion, and the other end portion; and a first bearing and a second bearing provided on an inner peripheral side of the back-pressure chamber formation member and the fixed iron core side opposite of the movable iron core therefrom, respectively, the first and second bearings axially displaceably supporting the shaft portion.

5. The damping force adjustable shock absorber according to claim 3, wherein the recessed portion is configured to allow the hydraulic fluid to axially flow.

6. The damping force adjustable shock absorber according to claim 5, wherein the recessed portion is one of a plurality of recessed portions provided on the thick cylindrical portion, and wherein each of the recessed portions is disposed at a position not opposite from each other in a radial direction of the fixation hole.

7. The damping force adjustable shock absorber according to claim 5, wherein an odd number of recessed portions are on the thick cylindrical portion.

8. The damping force adjustable shock absorber according to claim 6, wherein an odd number of recessed portions are on the thick cylindrical portion.

9. The damping force adjustable shock absorber according to claim 4, wherein the back-pressure chamber formation member, the movable iron core, and the fixed iron core are provided in a bottomed cylindrical cap member disposed on the inner peripheral side of the coil.

10. The damping force adjustable shock absorber according to claim 5, wherein a non-recessed portion of the fixation hole is fixed to the shaft portion.

11. The damping force adjustable shock absorber according to claim 1, wherein a thickness of the taper cylindrical portion on the back-pressure chamber side is equal to or thinner than a half of a thickness of the thick cylindrical portion.

12. A solenoid comprising:

a coil configured to generate a magnetic force by power supply;

a movable iron core located on an inner peripheral side of the coil and provided axially movably;

a fixed iron core located so as to axially face the movable iron core and provided on the inner peripheral side of the coil; and a shaft portion provided so as to axially extend on inner peripheral sides of the movable iron core and the fixed iron core and configured to be displaced integrally with the movable iron core, wherein the fixed iron core includes an annular conical portion on the movable iron core side, the annular conical portion having an outer peripheral surface formed into a taper surface shape sloped in such a direction that an outer diameter dimension is increasing toward the fixed iron core side, wherein the movable iron core includes a thick cylindrical portion and a taper cylindrical portion, the thick cylindrical portion axially facing the fixed iron core, the taper cylindrical portion axially extending from the thick cylindrical portion toward the other end portion side of the shaft portion and having an inner peripheral surface flaring so as to define a taper shape, wherein a bottomed hole portion is provided on an end surface of the fixed iron core that faces the movable iron core, and the movable iron core is inserted in the bottomed hole portion when the movable iron core is attracted, wherein the conical portion is formed on an outer peripheral side of the bottomed hole portion, wherein the movable iron core further includes a fixation hole on an inner peripheral side thereof, the shaft portion being fixed in the fixation hole, and wherein the thick cylindrical portion includes a recessed portion positioned around the fixation hole and formed so as to be radially recessed such that the recessed portion is radially open to the fixation hole, the recessed portion extending through the movable iron core in an axial direction of the movable iron core.

* * * * *